Figure 1:
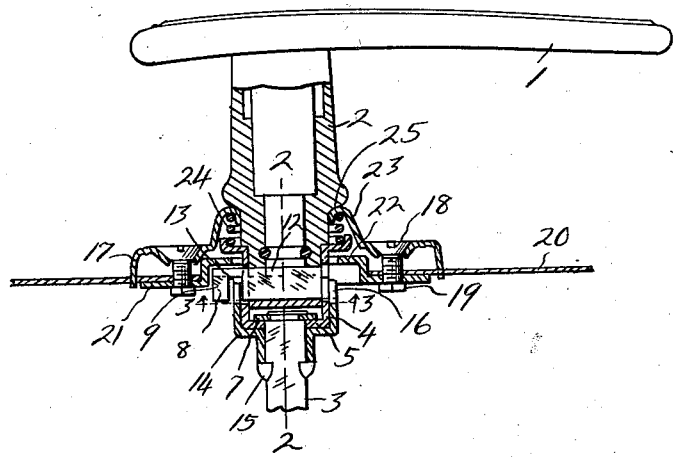

April 12, 1932. D. MILLER 1,853,918

HANDLE ASSEMBLY

Filed Jan. 14, 1929

INVENTOR
Dorr Miller

BY Whittemore Hulbert Whittemore Belknap

ATTORNEYS

Patented Apr. 12, 1932

1,853,918

UNITED STATES PATENT OFFICE

DORR MILLER, OF DETROIT, MICHIGAN, ASSIGNOR TO THE DURA COMPANY, OF TOLEDO, OHIO, A CORPORATION OF OHIO

HANDLE ASSEMBLY

Application filed January 14, 1929. Serial No. 332,490.

The invention relates to handle assemblies and refers more particularly to handle assemblies of the outside door handle type. One of the objects of the invention is to so construct the handle assembly that the handle may be connected to the lock actuating spindle to rotate the latter or may be free of the spindle so that rotation of the handle will not effect rotation of the spindle. Another object is to provide an improved arrangement of parts which may be economically manufactured. With these as well as other objects in view, the invention resides in the novel features of construction and combinations and arrangements of parts as more fully hereinafter set forth.

In the drawings:—

Figure 3:
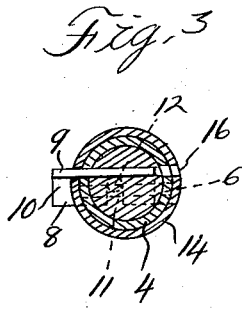
Figure 2:
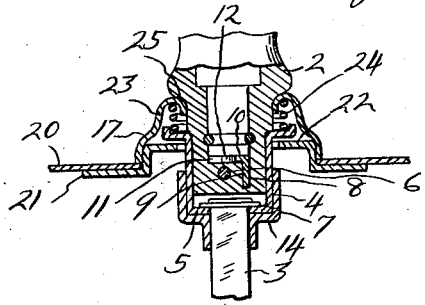

Figure 1 is a sectional view of a handle assembly embodying my invention;

Figures 2 and 3 are cross sections respectively on the lines 2—2 and 3—3 of Figure 1.

The invention is particularly applicable to handle assemblies for motor vehicles in which, as shown in the drawings, 1 is the outside handle of a motor vehicle door having the shank 2. 3 is the spindle for actuating the door lock. For connecting the handle to the spindle there is the cup-shaped member 4 encircling the inner end of the shank 2 and having its base 5 spaced inwardly from the inner end of this shank. This cup-shaped member is suitably fixedly secured to the shank as by means of the transverse pin 6. The upper end of the spindle 3 extends through and is journaled in the base 5 and is held from becoming disengaged therefrom by suitable means such as the washer 7, over which is spun the outer end of the spindle.

8 is a bolt extending transversely of and slidably engaging in aligned or registering transverse openings in the shank and cup-shaped member. This bolt, as shown, is L-shaped and preferably formed from sheet metal and has the inwardly extending flange 9 and the flange 10 extending transversely of the inwardly extending flange. The flange 10 is formed with the transverse slot 11 for engaging the crank 12 of a suitable locking mechanism located within the shank 2 and in the present instance adapted to be actuated by a suitable key. The inwardly extending flange 9 is formed with the inwardly opening slot 13 which in one position of adjustment of the bolt registers with the outer end of the driving sleeve 14. This driving sleeve encircles and bears upon the cup-shaped member 4 and is non-rotatably secured to the portion of the spindle 3 adjacent to the base of the cup-shaped member. As shown in the present instance, the non-rotatable connection is made by forming the engaging portions of the driving sleeve and spindle of polygonal shape and the driving sleeve is held from longitudinal movement relative to the spindle by striking up the fins 15 upon the spindle and abutting the inner end of the driving sleeve. The upper end of the driving sleeve is formed with the outwardly opening aligned slots 16, which are engageable with the inwardly extending flange 9 of the bolt when the latter is in another position. Both the cup-shaped member and driving sleeve are preferably formed of sheet metal.

With the parts as thus far described, it will be seen that by rotating the crank 12 the bolt 8 may be longitudinally moved transversely of the shank 2 and cup-shaped member 4 to a position such as shown in Figure 1 where the inwardly opening slot 13 of the bolt registers with the driving sleeve, at which time the handle may be rotated without rotating the spindle. It will be seen, however, that by swinging the crank 12 and longitudinally adjusting the bolt to a position to the right of that shown in Figure 1 the inwardly extending flange 9 of this bolt engaging in the aligned slots 16 of the driving sleeve will cause rotation of the spindle upon rotation of the handle so that the lock may be released to open the door.

17 is the escutcheon which is preferably formed of sheet metal and is secured to the door by the screws 18 and the nuts 19, the screws extending through the panel 20 of the door and the plate 21 secured to the inner side of the panel and the nuts engaging the inner side of this plate. This plate has the outwardly embossed portion 22 which is apertured for the passage of the cup-shaped member 4 and is located outwardly beyond the bolt 10 so that when the bolt is in a position, such as shown in Figure 1, this bolt functions to hold the handle from being pulled outwardly from the door. The outer end of the cup-shaped member is provided with the annular flange 23 between which and the outer end of the escutcheon is the coil spring 24 for holding the outer end of the escutcheon against the annular shoulder 25 upon the handle shank.

What I claim as my invention is:

1. The combination with a handle having a shank, a crank within said shank and a lock actuating spindle, of an L-shaped bolt extending transversely of said shank and slidably mounted therein, said bolt having an inwardly extending flange, and a flange extending transversely thereof formed with an opening for engagement with said crank, a driving member secured to said spindle having an outwardly opening slot for engagement with said inwardly extending flange in one position of adjustment of said bolt, said inwardly extending flange having an inwardly opening slot for registration with said driving member in another position of adjustment of said bolt.

2. The combination with a handle having a shank and a lock actuating spindle, of a cup-shaped member encircling and fixedly secured to said shank and rotatably connecting said spindle to said shank, and a bolt extending transversely of and slidably engaging said shank and cup-shaped member movable to positions keying said spindle to said shank for rotating the former from the latter and freeing said spindle from said shank for allowing rotation of the latter relative to the former.

3. The combination with a handle having a shank and a lock actuating spindle, of a cup-shaped member fixedly secured to said shank and rotatably connecting said spindle to said shank, said cup-shaped member and shank having registering transversely extending openings therethrough, a sleeve secured to said spindle and encircling said cup-shaped member, and a bolt slidably engaging said openings, said bolt having an inwardly opening slot for registering with said sleeve in one position of said bolt and said sleeve having an outwardly opening slot for engaging said bolt in another position thereof.

4. The combination with an outside door handle having a shank and a spindle for actuating the door lock, of a cup-shaped member encircling the inner end of said shank and secured thereto, the base of said cup-shaped member being spaced from the inner end of said shank and apertured for the passage of said spindle, means between the base of said cup-shaped member and the inner end of said shank for rotatably securing said spindle to said cup-shaped member, a sleeve secured upon said spindle and encircling said cup-shaped member, a bolt extending transversely of and slidable in said shank and cup-shaped member, said bolt having an inwardly opening slot for registering with said sleeve in one position of said bolt and said sleeve having an outwardly opening slot for engaging said bolt in another position thereof and a door plate having a portion located outwardly beyond and adjacent to said bolt.

5. The combination with a handle having a shank and a lock actuating spindle, of a bolt upon said shank and movable transversely thereof, said bolt having an angularly extending flange, a driving member secured to said spindle having a slot for engagement with said flange in one position of adjustment of said bolt, said flange having a slot for registration with said driving member in another position of adjustment of said bolt.

In testimony whereof I affix my signature.

DORR MILLER.